United States Patent [19]
Hopkins

[11] 3,883,384
[45] May 13, 1975

[54] HOSE MANUFACTURE
[75] Inventor: Paul Hopkins, Hockessin, Del.
[73] Assignee: Electric Hose & Rubber Company, Wilmington, Del.
[22] Filed: Feb. 8, 1973
[21] Appl. No.: 330,703

Related U.S. Application Data
[63] Continuation-in-part of Ser. No. 83,096, Oct. 22, 1970, abandoned.

[52] U.S. Cl. ............... 156/244; 138/126; 156/149; 156/248; 156/287; 156/289; 264/236
[51] Int. Cl. .......................................... B29d 23/00
[58] Field of Search .......... 156/143, 144, 148, 149, 156/155, 166, 168, 213, 244, 247, 285, 248, 344; 161/406; 138/123–126; 81/9.5 R, 9.51; 264/236, 313, 317

[56] References Cited
UNITED STATES PATENTS
| | | | |
|---|---|---|---|
| 1,622,340 | 3/1927 | Paeplow | 264/166 |
| 3,038,523 | 6/1962 | Merck et al. | 156/149 |
| 3,049,762 | 8/1962 | Jackson | 156/149 |
| 3,062,241 | 11/1962 | Brumbach | 156/149 |
| 3,255,284 | 6/1966 | Meislohn | 264/236 |
| 3,284,259 | 11/1966 | Galloway et al. | 156/149 |
| 3,684,602 | 8/1972 | Ball | 156/149 |

Primary Examiner—Charles E. Van Horn
Assistant Examiner—F. Frisenda
Attorney, Agent, or Firm—Connolly and Hutz

[57] ABSTRACT

A hose having an outer layer of readily deformable and vulcanizable material is protected during its manufacture by extruding a relatively thick soft flexible non-vulcanizable sheath made, for example, of rubber around the outer layer and vulcanizing the hose while the sheath remains thereon with the sheath then being removed after vulcanization of the hose.

1 Claim, 5 Drawing Figures

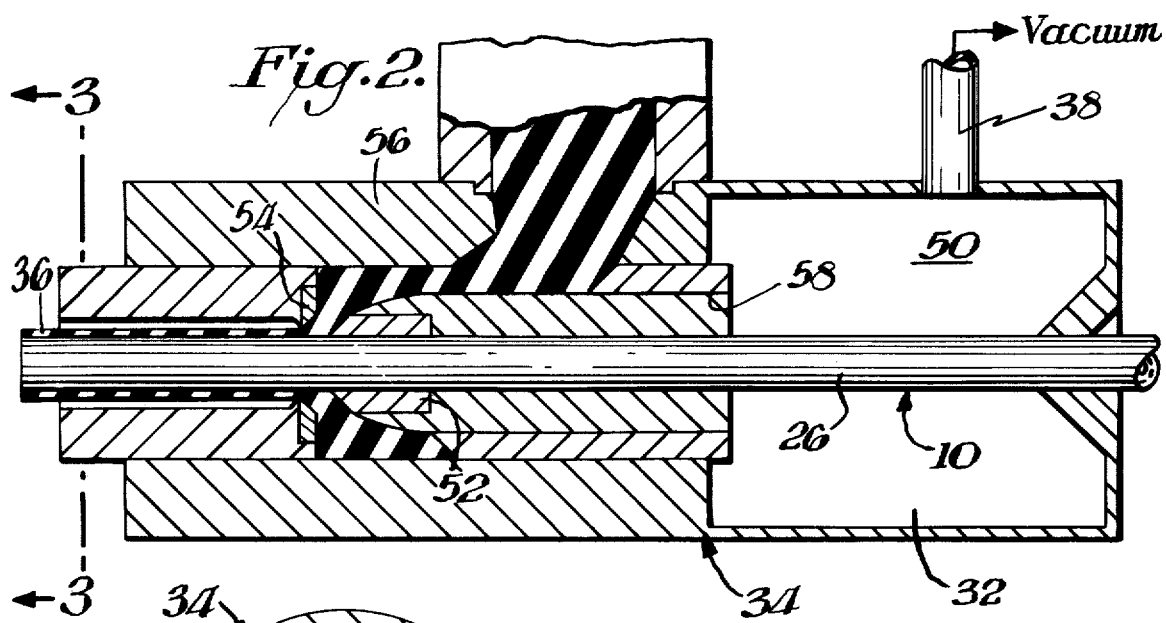
Fig. 2.
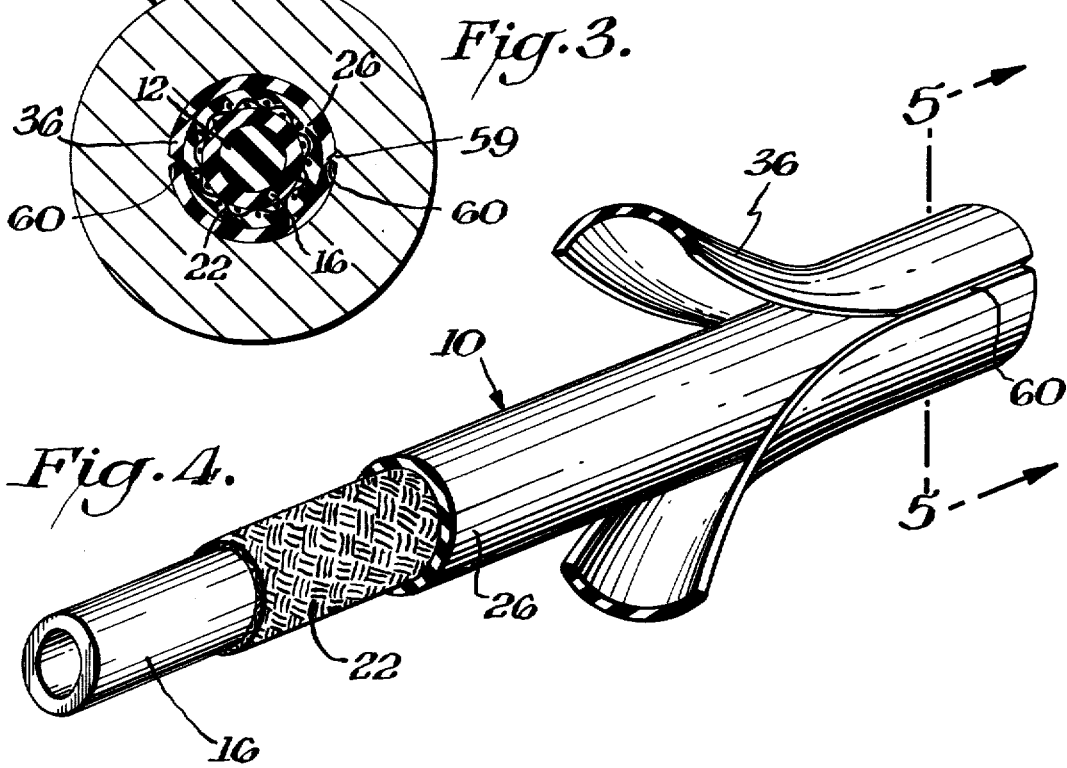
Fig. 3.
Fig. 4.
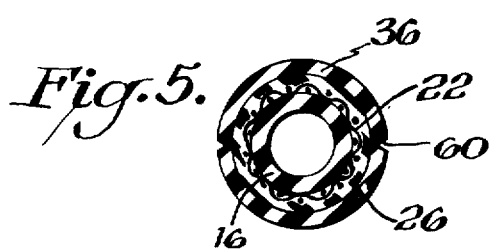
Fig. 5.

HOSE MANUFACTURE

CROSS-REFERENCE TO RELATED APPLICATION

This application is a continuation-in-part of application Ser. No. 83,096; filed Oct. 22, 1970 and now abandoned.

BACKGROUND OF THE INVENTION

This invention relates to hose manufacture particularly to the manufacturing of rubber type hoses which includes an outer layer of readily deformable, easily marked and vulcanizable material. During the subsequent vulcanization of such hoses damage occurs from the weight of the hose itself when layers of the coiled hose are placed atop each other. Damage also occurs when the hose is placed in the vulcanizing pan from scuffing and from imperfections in the pan. Additionally, for certain applications such as colored hoses it is necessary to maintain a clean appearance of the hose whereas this clean appearance is destroyed by the hose becoming dirty during its handling.

The prior art has attempted to overcome the above disadvantages by providing a removable protective covering on the hose which is intended to remain thereon during vulcanization. Generally this protective covering is made of lead. There are many drawbacks with this practice primarily because of the expense of the material and also because lead is not readily flexible, is heavy and is, therefore, difficult to handle.

A further attempt at avoiding the above disadvantages is disclosed in U.S. Pat. No. 3,255,284. In this patent a nylon sheath is extruded over the hose prior to vulcanizing and remains thereon during the vulcanization. The patent states that the nylon material may be reused for subsequent processes. In practice, however, nylon has not provided a satisfactory answer to solving the above problems. In this respect although nylon may be reused, the number of times of reuse is very limited. Moreover, nylon is highly sensitive to moisture and great care must be taken to assure that the nylon is completely dried before extrusion. Additionally, the nylon is slow in extruding, is relatively stiff and is expensive.

A still further attempt is disclosed in U.S. Pat. No. 3,684,602 to Ball which suggests disposing a longitudinally extending wire over the hose and extruding a thin rubber sheath thereon. The sheath is then removed by using the wire as a stripping tool. This practice has a number of disadvantages. Since the wire is disposed against the hose, during vulcanization the wire should form a longitudinal line on the surface of the hose which defeats one of the purposes of providing a sheath. Once used the sheath material cannot be reused. Moreover, the sheath must necessarily be thin for the wire to cut therethrough (Ball specifies a maximum thickness of 0.03 inch) and consequently provides minimal protection. Even Ball recognizes that under certain conditions an external wrapping must be employed.

SUMMARY OF INVENTION

An object of this invention is to provide a method for protecting a hose during its manufacture and in particular during the vulcanization thereof.

A further object of this invention is to provide such a method which incorporates a low cost removable sheath without detracting from the effectiveness of the protective ability of the sheath.

A still further object of this invention is to provide a novel article of manufacture in the form of a composite tubing and removable sheath therefor.

In accordance with this invention a hose or tube having an outer layer of readily deformable and vulcanizable material is protected during its manufacture by extruding a relatively thick soft flexible non-vulcanizable sheath made, for example, of rubber around the outer layer and vulcanizing the hose while the sheath remains thereon with the sheath then being removed after vulcanization of the hose.

The sheath may be made of a rubber material which is extruded around the hose in such a manner that the outer layer of the hose is subjected to a vacuum immediately prior to the sheath extrusion step. Score lines may be extruded into the sheath to facilitate the subsequent removal of the sheath from the hose. The hose itself may be formed around a flexible mandrel which maintains the shape of the hose during its manufacture. Alternatively, shape may be imparted to the hose during the manufacture thereof by the pressurization of the interior of the hose.

THE DRAWINGS

FIG. 2 is a cross-sectional view in elevation of an apparatus used in the sheath extrusion step of FIG. 1;

FIG. 3 is a cross-sectional view taken through FIG. 2 along the line 3—3 on an enlarged scale;

FIG. 4 is a perspective view partly broken away and in section of a composite hose-sheath in accordance with this invention; and FIG. 5 is a cross-sectional view taken through FIG. 4 along the line 5—5.

DETAILED DESCRIPTION

Figure 1:
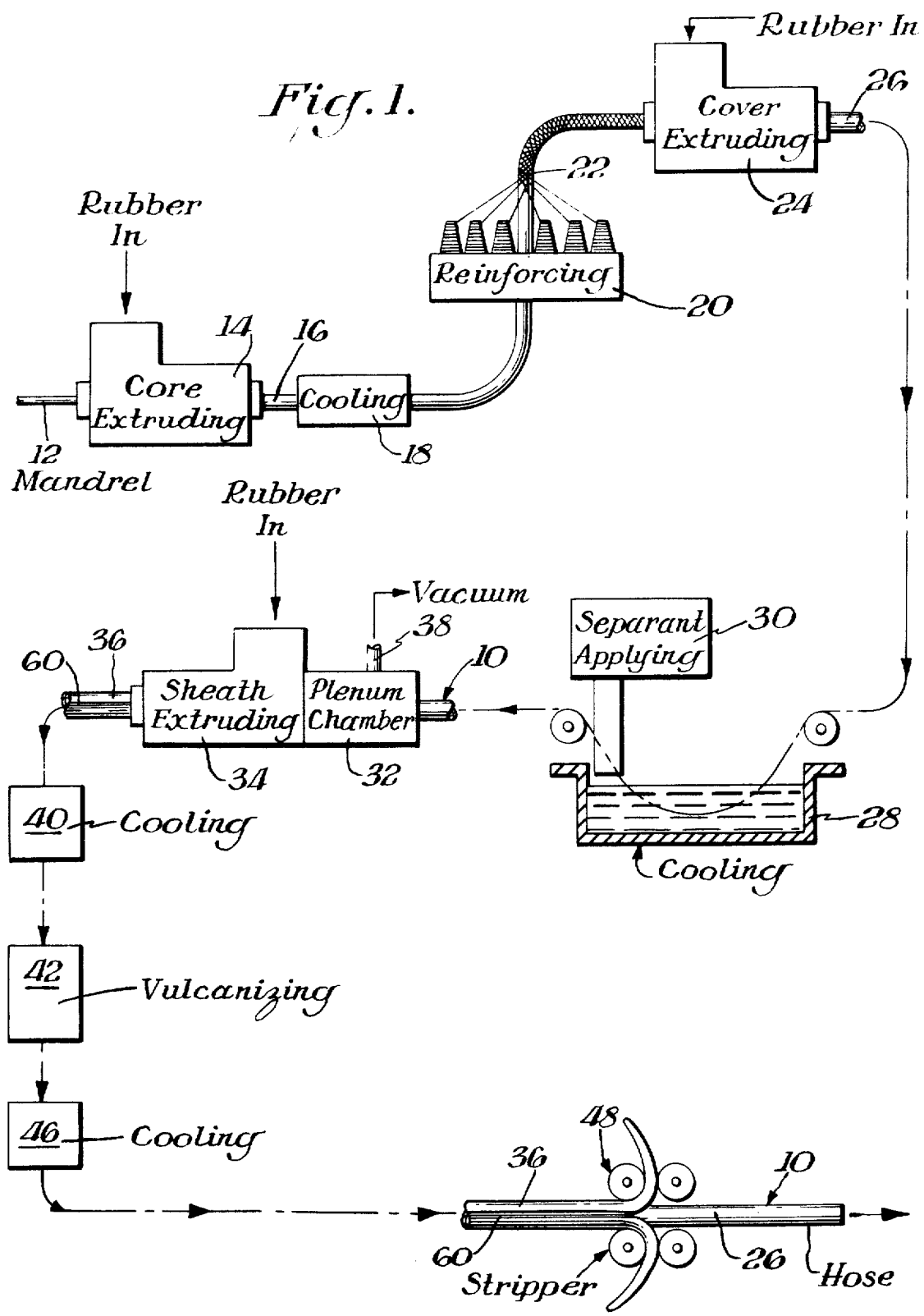
FIG. 1 is a schematic illustration of the steps utilized in the practice of this invention.

FIG. 1 schematically illustrates the steps utilized in the practice of this invention. As indicated therein a hose or tube 10 is formed by passing a flexible mandrel 12 through extruder 14. Mandrel 12 may, for example, be a solid prevulcanized rubber pole or may be of nylon or of any other conventional flexible or non-flexible material such as steel. A core layer 16 is thereby extruded over mandrel 12 and the mandrel 12 and core 16 are cooled in any suitable manner such as schematically illustrated by cooling station 18. Next the core and mandrel are passed through a reinforcing station 20 where reinforcing strands 22 are applied to the core. The reinforcing application may take place in any suitable manner such as by the braiding arrangement illustrated in FIG. 1 or by knitting, weaving, spiralling or any other means of applying the reinforcement thereto. The reinforced core and its mandrel then pass through extruder 24 where a cover or outer layer 26 is formed thereon. Core 16 and cover 26 are made of a vulcanizable material such as uncured rubber. It is to be understood that any number of reinforcing and/or vulcanizing layers may be used in the hose structure as dictated by the intended use of the hose. The invention, however, is directed to such arrangements where the exposed or outer layer is made of readily deformable, easily marked material. This material may thereby be an outer laminant of a multi-layer hose or may be the sole layer in a single ply hose.

After hose 10 is formed but is still uncured the hose is cooled in any suitable manner such as by passing through a water chamber 28. A separant such as mica or silicone is then applied in any suitable manner at station 30 to hose 10. Next the hose passes through a plenum chamber 32 and immediately thereafter through extruder 34 to extrude the removable sheath 36 thereon. As later described the plenum chamber is subjected to vacuum through line 38 thereby assuring intimate contact of the sheath 36 to the hose 10. The composite structure of hose and sheath is then cooled in cooling station 40 and vulcanized in vulcanizing station 42.

The vulcanization may take place in any suitable manner such as by means of a steam autoclave in which a large plurality of coiled layers of the composite hose and sheath are placed atop each other. The provision of mandrel 12 assures the maintenance of the desired shape to hose 10. Alternatively, the core 16 may be formed without the use of a mandrel. The vulcanization may take place by charging the hose with water, air or other gases under pressure and placing the hose in steam vulcanizers. During vulcanization, as a result of the pressure inside the hose which pushes against the hose and sheath, the core and the reinforcing means and the cover are forced together into one unit. At the same time the heat vulcanizes the rubber in core 16 and cover 26 converts it from a soft sticky substance into a tough durable material. During vulcanization use is advantageously made of the steam and pressure inherently created thereby to act as an external mold thus eliminating the need for rigid mold materials such as the lead or nylon of the prior art.

It is to be understood that the particular method of vulcanization is not critical to this invention. Thus any suitable vulcanizing means may be employed without departing from the spirit of this invention.

After vulcanization the composite structure of hose and sheath is cooled at station 46. The cooling may be simply exposure to the atmosphere or may be by means of a shower. Sheath 36 is then removed by suitable strippers 48. Next the mandrel is removed from core 16 in any suitable manner such as by subjecting the hose interior and mandrel to pressure to blow out the mandrel. Alternatively, the mandrel may be removed from the hose prior to the sheath removal. In such a case, the sheath may remain on the hose for long periods of time so that the sheath functions to protect the hose during its storage, handling and transportation.

FIGS. 2–3 show the details of the plenum chamber 32 and extruder 34. As indicated therein a vacuum line 38 communicates with the hollow interior 50 of plenum chamber 32. Plenum chamber 32 is connected to extruder 34 which includes a male die 52 inserted into female die 54 with the raw sheath material being forced into a suitable passageway in die block 56 by a plunger (not shown) for extrusion around hose 10. Since the passageway in male block 58 which carries die 52 communicates with hollow interior 50, the outer surface of hose 10 is exposed to the vacuum pressure right up to the point at which cover 36 is extruded onto hose 10. Thus there is assurance of intimate contact between hose 10 and sheath 36 since the vacuum prevents the formation of air pockets or the retention of contaminants on hose 10 which would otherwise interfere with the intimate contact between sheath 36 and hose 10. Despite the application of vacuum the separant remains on hose 10 to facilitate subsequent removal of sheath 36.

Although the utilization of a vacuum gives highly desirable results, it is to be understood that the inclusion of the vacuum is optional and is merely a preferred alternative.

Advantageously, female die 54 includes a pair of diametrically opposed V-shaped projections 59 (FIG. 3) for forming a pair of score lines or grooves 60 in sheath 36. These score lines also facilitate the subsequent removal of the sheath from the hose.

FIGS. 4–5 illustrate the resultant composite structure of hose 10 and sheath 36. Thus as indicated therein this composite structure includes the core 16, cover 26 and intermediate reinforcing means 22, as well as sheath 36. As is apparent from FIGS. 3–5 sheath 36 is relatively thick and in the illustrated embodiment is about the same thickness as core 16.

After core 36 is removed the material therefrom may be reused for further application by extruder 34.

A preferred material for sheath 36 is a flexible nonvulcanizable rubber-like material such as EPDM (terpolymer of ethylene, propylene and a diene), EPM (copolymers of ethylene and propylene) or CSM (chloro-sulfonyl-polyethylene) based materials which lack the necessary vulcanizing agents. These materials are quite effective because they are not particularly sensitive to moisture, as is nylon, although desirably the materials are applied in a dry state. These materials are also capable of indefinite reusability. If desired inert materials such as Vistanex (a registered trademark of Enjay Co. for a high-molecular-weight hydrocarbon polymer produced by polymerizing isobutylene, a petroleum derivative) based materials may also be used for sheath 36. Although these rubber materials are preferred because, for example of their low cost, ready reusability, flexibility, speed in extrusion and relative insensitivity to moisture, other materials having similar characteristics may also be used. Such other materials may include thermo-elastic plastic materials which likewise must not necessarily be completely dry for extrusion and which have the desired flexibility for sheath 36.

In the preferred form of this invention the unvulcanizable composition has a thickness about 0.125 or less and may be even be as low as 0.04 to thereby give protection during the take-off and coiling of hose onto pans. The material is sufficiently thick to permit easy removal after vulcanization by scoring the sheath lengthwise at time of removal or before vulcanization of hose. The use of a thicker sheath eliminates the need for a longitudinal wire as described in the Ball patent.

The following is an exemplary form of this invention and is not intended to limit the claims. A hose for use in automotive air conditioning is formed to include an inner lining of compounded acrylonitrile synthetic rubber, a double braid of rayon fiber and an outer cover of compounded chloroprene synthetic rubber and is manufactured as follows:

A flexible rubber mandrel one-half inch in diameter and approximately 300 ft. long is covered with an extruded tube of acrylonitrile synthetic rubber compound having a thickness of one-eighth inch. Two braided plies of rayon fiber are then applied with a calendered sheet of 0.010 inch thickness and 3 inch width formed around the hose lengthwise between the braids during the braiding operation. An outer cover of chloroprene synthetic rubber compound having an outer diameter of 1 inch is then extruded over the rayon fiber braid. During this operation a vacuum is applied in the extruder head to remove substantially all the air or volatile matter which would be entrapped under the extruded cover. This hose is then immediately passed through a second extruder where a sheath of unvulcanizable EPDM compound of 0.075 inch thickness is formed around the outer cover of the hose. A vacuum is applied to the extruder head to remove substantially all the air and volatile materials between the hose cover and sheath covering. Two adjustable knives are attached to the outer extruder dies set in such a manner as to cut to a depth of about one-half the thickness of the sheath in order to enable easy removal after vulcanization of the hose. The sheath covered hose is coated with an emulsion of water and silicone oil to prevent the coiled hose from adhering to itself and is then cooled onto 6 foot diameter pans two layers high, and subjected to vulcanization for a period of 30 minutes at 55 psi steam pressure in an autoclave. After vulcanization, the sheath is removed by tearing each half of the sheath away from the hose along the lengthwise score lines.

The practice of this invention is particularly superior to prior art lead or nylon covers. In this respect lead pipe or nylon pipe extruded over unvulcanized hose frequently varies in inside diameter during application over the hose with the result the hose cover is not firmly molded and thus becomes rough and spongly during vulcanization due to the inability of the rigid pipe to be pressed down onto the cover by the steam pressure in the autoclave. This problem is eliminated by the use of the non-vulcanizing sheath which, due to the soft nature of the material, transmits the pressure of the steam during the vulcanization operation uniformly over the entire surface of the hose.

The inventive sheath is further advantageous over non-molded open cured hose. The sheath minimizes damage to the unvulcanized hose due to the take-off mechanism of the cover machine, scuffing, and damage during coiling onto pans. The thick sheath eliminates the flat or deformed areas caused by the weight of the hose against the metal pan during vulcanization. Also it permits the hose to be vulcanized in multi-layers on a pan without marking or distortion of the cover.

Where the sheath is not used on open steam cured mandrel type hose, the cover is frequency rough due to the tube or rubber layers between braids extruding through the interstices of the reinforcement due to the thermal expansion of the mandrel and/or heat shrinkage of the reinforcement during vulcanization. The use of a heavy wall sheath eliminates or minimizes this effect and gives a cover surface that is commercially acceptable.

What is claimed is:

1. In a method of protecting a flexible hose during its manufacture wherein the hose includes an outer layer of readily deformable vulcanizable material, the improvement comprising passing the hose through an extruding machine, extruding around the hose a relatively thick soft flexible sheath made from a rubber material which lacks the necessary vulcanizing agents to render the sheath non-vulcanizable and reuseable, the sheath being extruded directly on the hose without any structural element therebetween, placing the hose carrying sheath in a steam autoclave by coiling a plurality of layers of the sheath carrying hose atop each other without any temporary wrapping as a means of protection, vulcanizing the hose with the use of heat and external pressure applied against both the sheath and the hose by utilizing the pressure developed in the steam autoclave to act against the external hose surface by being transmitted through the sheath, maintaining the sheath unvulcanized on the hose during vulcanization of the hose with the sheath remaining distinct and readily removable from the hose after vulcanization thereof, and removing the sheath from the hose after the hose has been vulcanized by the utilization of stripping elements which strip the sheath from the hose.

* * * * *